(12) United States Patent
Wilken et al.

(10) Patent No.: US 7,519,258 B2
(45) Date of Patent: Apr. 14, 2009

(54) PRECONNECTORIZED FIBER OPTIC LOCAL CONVERGENCE POINTS

(75) Inventors: Josh M. Wilken, Keller, TX (US); Harley J. Staber, Berlin (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/643,344

(22) Filed: Dec. 21, 2006

(65) Prior Publication Data
US 2008/0152292 A1 Jun. 26, 2008

(51) Int. Cl.
*G02B 6/00* (2006.01)
(52) U.S. Cl. .................................................. 385/135
(58) Field of Classification Search ........................ None
See application file for complete search history.

(56) References Cited

U.S. PATENT DOCUMENTS

| | | | | |
|---|---|---|---|---|
| 4,958,900 | A | 9/1990 | Ortiz, Jr. ................... | 350/96.18 |
| 5,050,949 | A | 9/1991 | DiGiovanni et al. ........ | 359/341 |
| 5,260,957 | A | 11/1993 | Hakimi et al. ................ | 372/39 |
| 5,386,490 | A | 1/1995 | Pan et al. .................... | 385/134 |
| 5,867,621 | A * | 2/1999 | Luther et al. ................. | 385/59 |
| 5,881,200 | A | 3/1999 | Burt ............................ | 385/142 |
| 6,049,413 | A | 4/2000 | Taylor et al. ................ | 359/337 |
| 6,206,583 | B1 | 3/2001 | Hishikawa et al. ............ | 385/96 |
| 6,259,851 | B1 | 7/2001 | Daoud ......................... | 385/135 |
| 6,441,944 | B1 | 8/2002 | Kim et al. .................... | 359/281 |
| 6,487,336 | B1 | 11/2002 | Yao ............................. | 385/24 |
| 6,535,579 | B1 | 3/2003 | Blake et al. ............. | 379/22.06 |
| 6,539,160 | B2 | 3/2003 | Battey et al. ................ | 385/135 |
| 6,577,801 | B2 | 6/2003 | Broderick et al. ........... | 385/125 |
| 6,628,870 | B2 | 9/2003 | Yamaguchi .................. | 385/123 |
| 6,650,458 | B1 | 11/2003 | Prosyk et al. ............... | 359/276 |
| 6,710,366 | B1 | 3/2004 | Lee et al. ...................... | 257/14 |

(Continued)

FOREIGN PATENT DOCUMENTS

JP 62-27312 2/1987

(Continued)

OTHER PUBLICATIONS

The Book on FTTX—From Design to Deployment: A Practical Guide to FTTX Infrastructure. ADC Telecommunications, Inc., Oct. 2005, pp. 61-62. Retrieved from http://www.adc.com/webcontent/productsandservices/productsolutions/fttp/book/FinalBook.pdf.*

(Continued)

*Primary Examiner*—Uyen Chau N Le
*Assistant Examiner*—Mike Stahl
(74) *Attorney, Agent, or Firm*—John H. Vynalek

(57) ABSTRACT

There is provided fiber optic local convergence points that provide preconnectorized functionality to eliminate all or most of the splicing associated with local convergence points in fiber optic distribution networks. The local convergence points provide a plurality of preconnectorized multi-fiber ports adapted to receive a preconnectorized end of a distribution cable within the enclosure of the local convergence point, on the enclosure itself, or outside the enclosure. For example, the local convergence point may provide preconnectorized multi-fiber ports outside the enclosure with an accumulator optically connected to the interior of the local convergence with an accumulator cable, wherein the accumulator comprises the plurality of preconnectorized multi-fiber ports.

14 Claims, 8 Drawing Sheets

U.S. PATENT DOCUMENTS

| | | | |
|---|---|---|---|
| 6,711,340 B2 | 3/2004 | Dickson | 385/140 |
| 6,721,507 B2 | 4/2004 | Iwata et al. | 398/79 |
| 6,766,094 B2 | 7/2004 | Smith et al. | 385/135 |
| 6,778,752 B2 | 8/2004 | Laporte et al. | 385/135 |
| 6,782,209 B2 | 8/2004 | Copeland et al. | 398/157 |
| 6,795,552 B1 | 9/2004 | Stanush et al. | 379/413.01 |
| 6,815,612 B2 | 11/2004 | Bloodworth et al. | 174/50 |
| 6,863,446 B2 * | 3/2005 | Ngo | 385/72 |
| 6,934,433 B2 | 8/2005 | Miyata et al. | 385/16 |
| 6,968,107 B2 | 11/2005 | Belardi et al. | 385/127 |
| 7,054,513 B2 | 5/2006 | Herz et al. | 385/12 |
| 7,088,899 B2 | 8/2006 | Reagan et al. | 385/135 |
| 7,103,255 B2 | 9/2006 | Reagan et al. | 385/135 |
| 7,218,827 B2 | 5/2007 | Vongseng et al. | 385/135 |
| 7,218,828 B2 | 5/2007 | Feustel et al. | 385/135 |
| 7,274,850 B2 | 9/2007 | Wittmeier et al. | 385/135 |
| 7,277,620 B2 | 10/2007 | Vongseng et al. | 385/135 |
| 7,362,925 B2 | 4/2008 | Miyata et al. | 385/14 |
| 2005/0021392 A1 | 1/2005 | English et al. | 705/12 |
| 2005/0213921 A1 | 9/2005 | Mertesdorf et al. | 385/135 |
| 2006/0008231 A1 | 1/2006 | Reagan et al. | 385/135 |
| 2006/0093303 A1 | 5/2006 | Reagan et al. | 385/135 |
| 2006/0153517 A1 | 7/2006 | Reagan et al. | 385/135 |
| 2006/0233506 A1 | 10/2006 | Noonan et al. | 385/134 |
| 2006/0263029 A1 | 11/2006 | Mudd et al. | 385/135 |
| 2007/0165995 A1 * | 7/2007 | Reagan et al. | 385/135 |

FOREIGN PATENT DOCUMENTS

| | | |
|---|---|---|
| JP | 1-182802 | 7/1989 |
| JP | 2005-338436 | 12/2005 |
| WO | WO02/093215 A2 | 11/2002 |
| WO | WO2004/086112 A1 | 10/2004 |
| WO | 2005/050277 A2 | 6/2005 |
| WO | 2005/088373 A1 | 9/2005 |
| WO | WO2006/044080 A1 | 4/2006 |
| WO | 2006/050505 A1 | 5/2006 |
| WO | 2006/135524 A2 | 12/2006 |

OTHER PUBLICATIONS

AFL Telecommunications, A Fujikura Business, Product Sheet, Future Access™ Fiber Distribution Hub (FDH), © 2005.

Patent Cooperation Treaty, Annex to the Invitation to Pay Additional Fees, Communication Relating to the Results of the Partial International Search, International Application No. PCT/US07/026155, 4 pages, date unknown.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol 4578, pp. 271-282; 2001.

PennWell Corporation, "Bringing Fiber to the multi-dwelling unit", reprinted with revisions to format, from the Oct. 2005 edition of Cabling Installation & Maintenence, Copyright 2005.

Corning Cable Systems LLC, Product Information Sheet, OptiTect™ Premier Local Convergence Cabinet, An Evolant© Solutions Product, Sep. 2006, 6 pages.

FONS, Fiber Optic Network Solutions, "Fiber Distribution Terminals", Fiber Access Terminals, Copyright© FONs Corp. 2005, www.fons.com, 3 pages.

FONS, Fiber Optic Network Solutions, "Indoor Fiber Distribution Terminal", "Interior Wall Mount Terminals", Copyright© FONS Corp. 2005, www.fons.com, 3 pages.

ADC Spec Sheet "OmniReach™ FTTX Solutions", "Outdoor Fiber Distribution Terminal 24 (OFDT-24)", 103335AE, Jan. 2007 Revision© 2006, 2007 www.adc.com, 4 pages.

ADC Spec Sheet "OmniReach™ FTTX Solutions", "Indoor Fiber Distribution Terminal", 103266AE, Aug. 2006 Revision© 2006 www.adc.com, 4 pages.

ADC Catalog "OmniReach™ FTTP Solutions", "Fiber Distribution Terminals", "FTTP Infrastructure Solutions", "Fiberglass In-Ground Mounting Sleeve", "Above Ground Cabinet Mounting", "Pad or Pole Mounting", "Accessories", 1276550 Apr. 2004, Revision™ 2003, 2004 www.adc.com, 12 pages.

Emerson product sheet, "NetSpan™ Fiber Distribution Hub Fiber Cross-Connect Enclosure", "Outside Plant for Business Continuity", © 2006 Emerson Network Power Energy Systems, North America, www.EmersonNetworkPower.com/Energy_Systems.Com, 2 pages.

SPC TelEquip product sheet, "FiberGard Distribution Terminal 48 Fiber-Indoor/Outdoor", "The compact solution for fiber provisioning", www.spc.net/2005/Fiber%/20Optics%20FiberGard%20Dist%20Term%2048.html.

Corning Cable Systems Product Specification Sheet, OptiSplice™ Premier iLID Fusion Splicer, Jun. 2004, 4 pages.

Corning Cable Systems Product Specification Sheet, Downloading Spice Data from M90, miniMASSφ, and X7 Series Fusion Splicers, Sep. 2002, 3 pages.

JM Fiber Optics Inc. Product Index, Altima XMiniature Automatic Fusion Splicer, Apr. 22, 2004, 3 pages.

Sumitomo Electric Lightwave Corp. "Type 36 Single Fiber Fusion Splicer" 1998.

Wach, Patrick, PCT Search Report and Opinion including all therein cited references. Aug. 22, 2005.

Hitachi Cable Review No. 24 "Low-loss Holey Fiber", Aug. 2005, 5 pages.

Draka Comteq/Optical Fibre, Issue Date: Aug. 2006, Supercedes: -/-, "BendBright$^{xs}$ Single Mode Optical Fibre, Enhanced low macrobending sensitive, low water peak fibre, Product Type: G.652D, Coating Type: ColorLock™ and Natural", www.drakafibre.com|www.draka.com, 2 pages.

\* cited by examiner

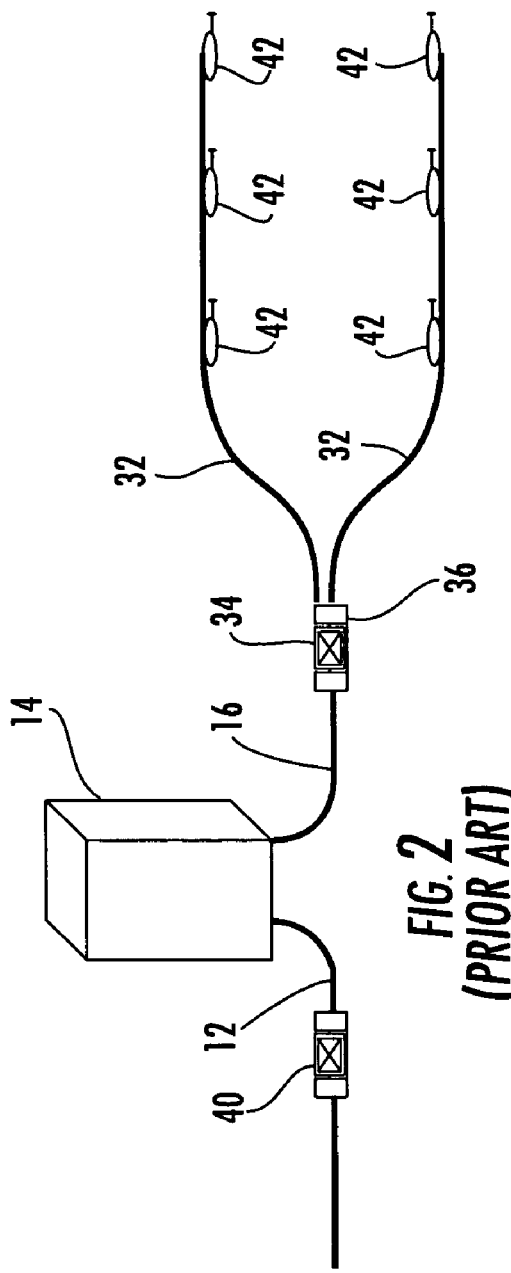
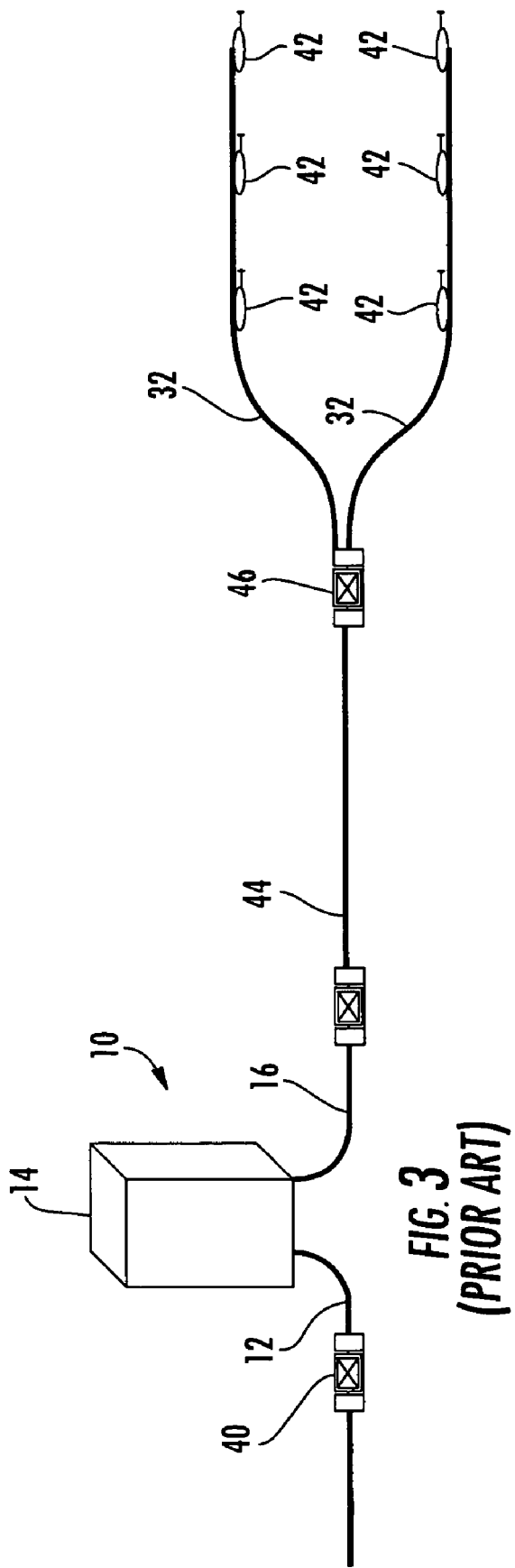
FIG. 2 (PRIOR ART)
FIG. 3 (PRIOR ART)

PRECONNECTORIZED FIBER OPTIC LOCAL CONVERGENCE POINTS

BACKGROUND OF THE INVENTION

1. Field of the Invention

The present invention is related to fiber optic networks, and more particularly, to fiber optic local convergence points having preconnectorized connections.

2. Description of Related Art

Fiber optic distribution networks typically include a central office from which optical signals originate and are transmitted to a number of subscribers via the network. Feeder cables usually extend from the central office to one or more local convergence points. At the local convergence point the optical signals from the central office are often split from each of the optical fibers of the feeder cable to a plurality (such as 16, 32, or 64) of optical fibers of a distribution cable. The optical fibers of the distribution cable are then routed to a network access point where the optical fibers are connected, spliced, or otherwise placed in optical communication with drop cables that typically are routed to a subscriber's premises, such as a home or business. In addition to providing a splitter in the local convergence point ("LCP"), LCPs often include a subscriber termination field comprising a plurality of adapters to selectively connect a pigtail extending from a splitter to an optical fiber of the distribution cable, thereby enabling a technician to selectively activate a subscriber by simply plugging a pigtail into a particular adapter (and selectively deactivate a subscriber by removing the pigtail).

Installation of such LCPs is often very time-consuming given the number of splices a technician must perform when optically connecting the LCP to the feeder cable and/or distribution cable. For example, an LCP having 432 distribution outputs requires splicing of all 432 fibers of the distribution cable(s), which may take a technician over twenty-two hours to splice. Even if optical fiber ribbon cable is utilized, it may take a technician over eight hours to splice the 432 fibers of the distribution cable. FIG. 1 provides a schematic representation of a conventional LCP 10 having a feeder cable 12 enter the enclosure 14 of the LCP and a distribution cable 16 exit the LCP. Within the LCP, each optical fiber 18 of the feeder cable 12 is connected to a splitter input 20 of a splitter 22. The fourteen optical fibers 18 are split into 432 optical fibers of a distribution cable 16 (thirteen optical fibers are split into thirty-two (1×32) and one optical fiber is split into sixteen (1×16) to provide the 432 distribution fibers). The splitter outputs 26 are selectively connected to the optical fibers 28 of the distribution cable using a subscriber termination field 30 (represented by the gap between the connectors of the splitter outputs 26 and the connectors of the optical fibers 28). However, the distribution cable 16 requires splicing of the distribution optical fibers 28 to one or more distribution cables 32, which in this exemplary embodiment are six distribution cables of 72 fibers each. Not only do the splices 34 require a significant amount of labor, as described above, but additional equipment is needed to provide the actual splice and to store the splices (such as a below grade handhole or other closure 36).

The LCP of FIG. 1 is illustrated again in FIGS. 2 and 3 with additional components of the fiber optic distribution network shown. The feeder cable 12 typically must be spliced 40 prior to entering the enclosure 14 of the LCP 10, just as the distribution cable 16 is spliced 34 after exiting the enclosure of the LCP. This enables the LCPs 10 to be shipped into the field with stub feeder cable 12 and stub distribution cable 16 that are already routed, connected, and/or connectorized within the LCP. As shown in FIG. 2, the distribution cable 16 is spliced 34 into distribution cables 32 that define a plurality of network access points 42 to which drop cables (not shown) may be optically connected. FIG. 3 represents a fiber optic distribution network wherein the network access points 42 must be located a relatively far distance from the LCP, thus requiring an additional distribution cable 44 to provide the additional length. The additional distribution cable 44 also requires additional splices 46.

Therefore, a need exists for improved LCPs and fiber optic distribution networks that do not require splicing of the distribution cable and/or feeder cable. Elimination of such splicing would reduce the time, skill level, and expense of performing a large number of splices and eliminate the equipment needed for such splicing.

BRIEF SUMMARY OF THE INVENTION

The various embodiments of the present invention address the above needs and achieve other advantages by providing local convergence points ("LCPs") comprising a plurality of preconnectorized multi-fiber ports that obviate the need to perform the splicing required by prior art LCPs. More specifically, the various embodiments of the present invention provide a plurality of preconnectorized multi-fiber ports within an interior cavity of the LCP, on an exterior wall of the LCP, and/or external to the LCP. Therefore, the LCPs of the present invention enable quick installation of an LCP in the field by enabling connection of the distribution cable(s) to the LCP without splicing.

One embodiment of the present invention provides an outside plant LCP in a fiber optic distribution network comprising at least one feeder cable and at least one distribution cable, wherein the LCP is adapted to provide optical connectivity between the feeder cable and the distribution cable. The LCP comprises an enclosure comprising an exterior wall and an interior cavity therein. Access to the interior cavity is provided through at least one door provided on the exterior wall. The LCP also includes a splitter within the interior cavity and in optical communication with at least one optical fiber of the feeder cable. The splitter is adapted to provide optical connectivity between the optical fiber of the feeder cable and a plurality of pigtails. The LCP further includes a subscriber termination field mounted within the interior cavity and comprising a plurality of adapters for selective optical connection between a pigtail of the plurality of pigtails and a subscriber fiber. The LCP also comprises a plurality of preconnectorized multi-fiber ports provided on a panel within the interior cavity, wherein the preconnectorized multi-fiber ports are in optical communication with a plurality of subscriber fibers. The plurality of preconnectorized multi-fiber ports of the LCP are adapted to receive a preconnectorized end of the distribution cable to thereby provide optical connectivity between the plurality of subscriber fibers and the distribution cable. In some embodiments of the present invention the panel to which the preconnectorized multi-fiber ports are attached comprises a rear panel of the subscriber termination field.

Further embodiments of the present invention provide the plurality of preconnectorized multi-fiber ports on an exterior wall of the LCP. Still further embodiments of the present invention provide an accumulator outside the exterior wall of the enclosure of the LCP. The accumulator includes the plurality of preconnectorized multi-fiber ports. Therefore, the LCPs of various embodiments of the present invention provide preconnectorized multi-fiber ports to facilitate convenient optical connection of one or more distribution cables to the LCP. Furthermore, certain embodiments of the present invention allow selective optical connection of distribution cables to the LCPs without the need for technicians to enter the LCP, thus reducing the risk of unintentional damage within the interior of the LCP and simplifying connection of the distribution cable.

BRIEF DESCRIPTION OF THE SEVERAL VIEWS OF THE DRAWINGS

Figure 1:
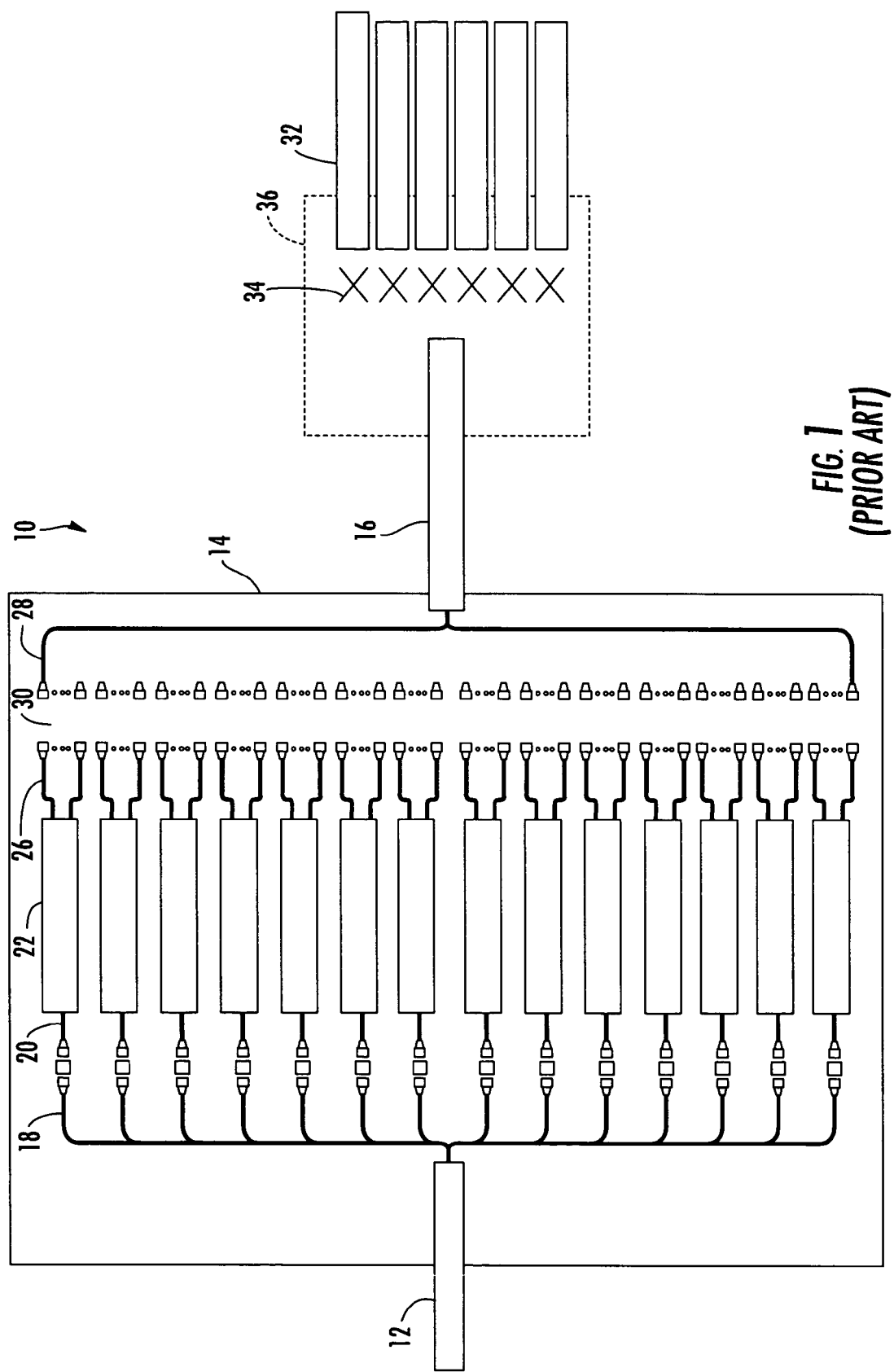
Figure 4:
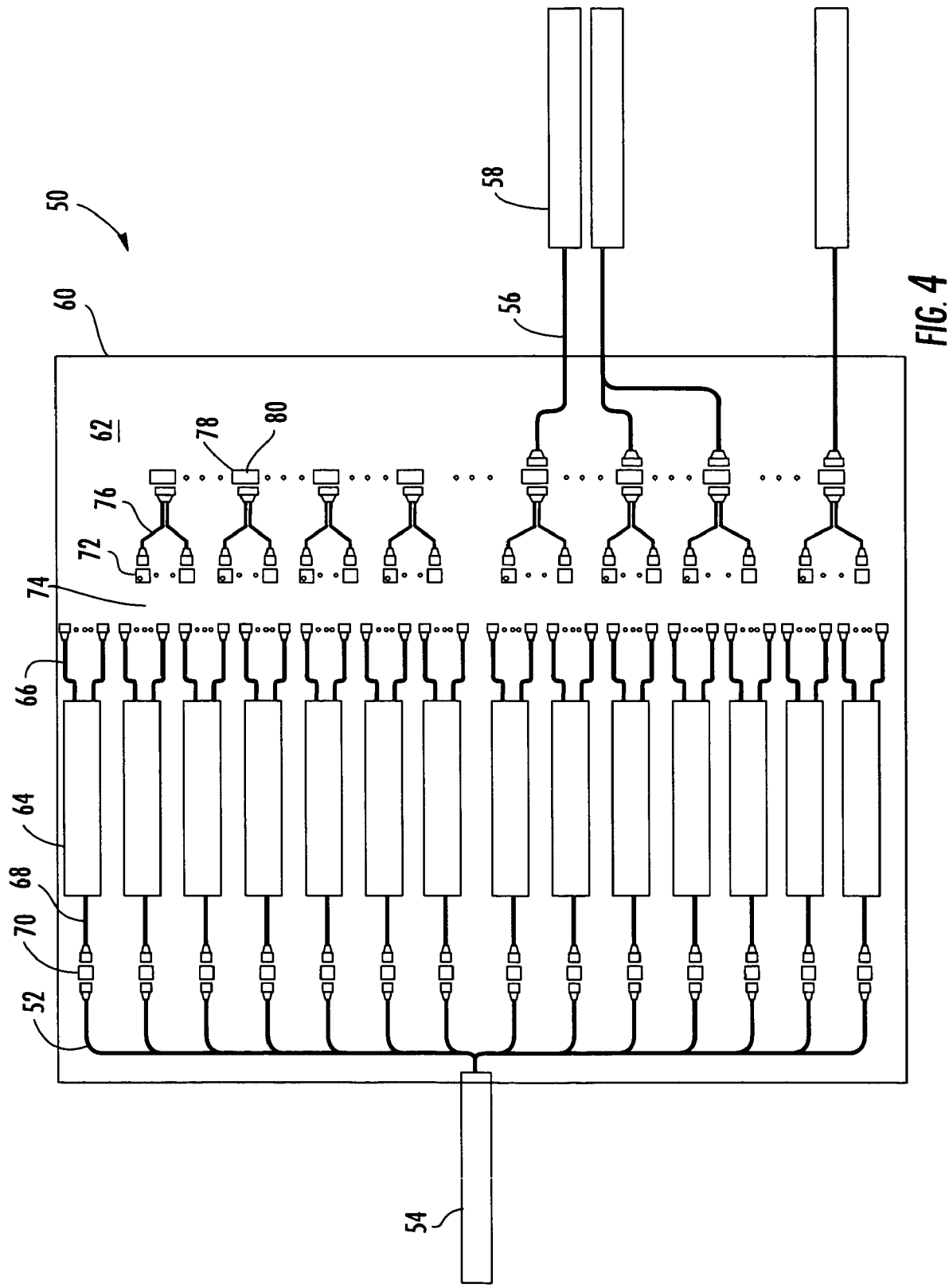
Figure 5:
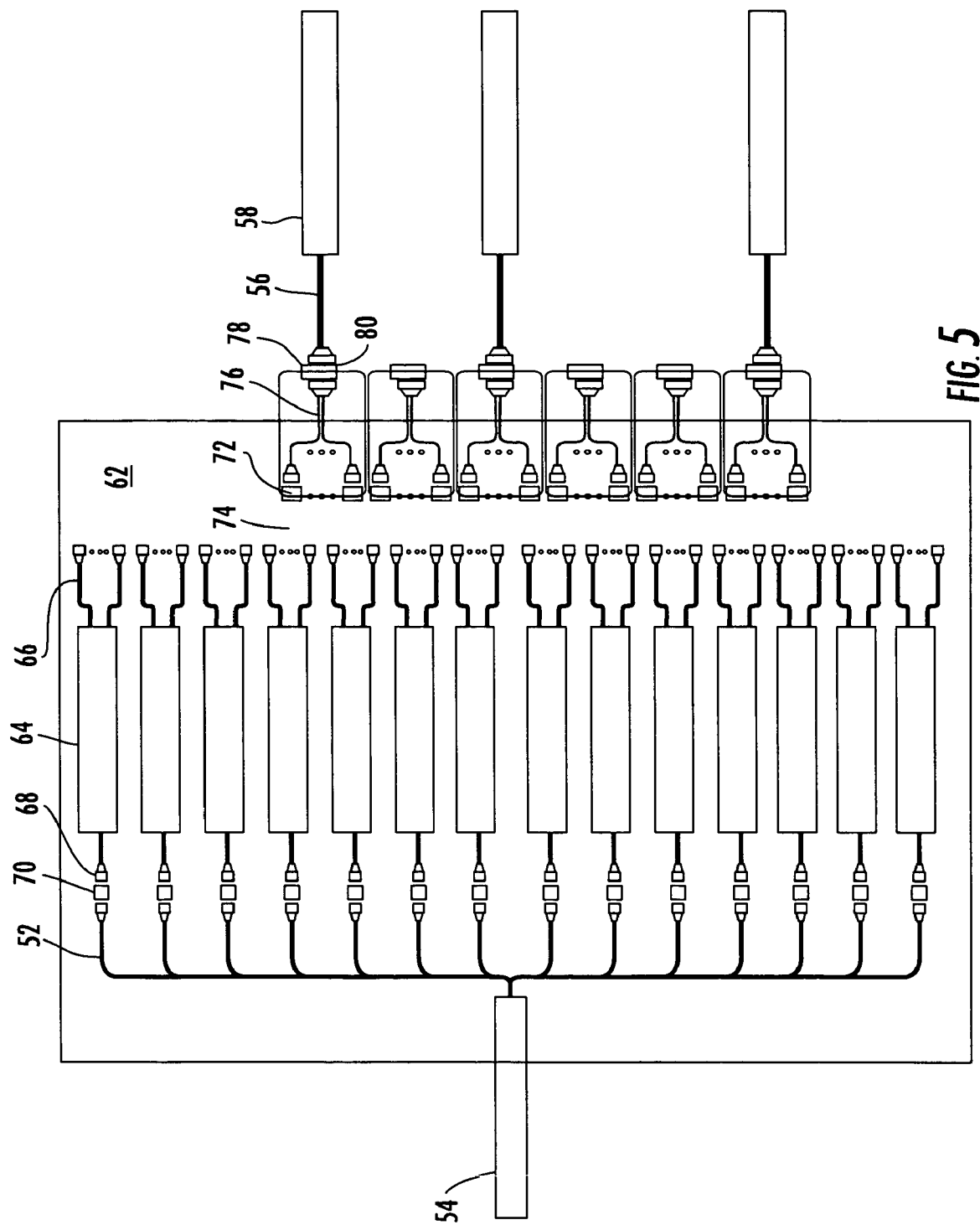
Figure 6:
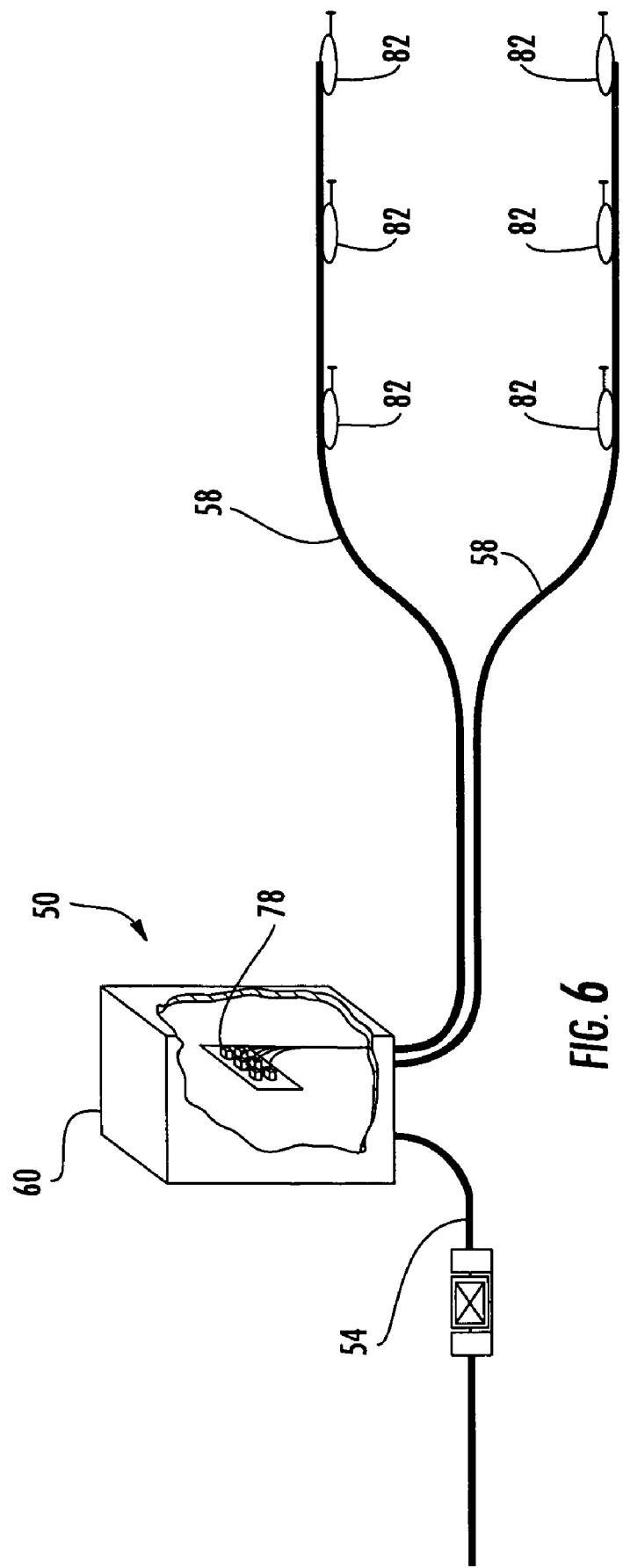
Figure 7:
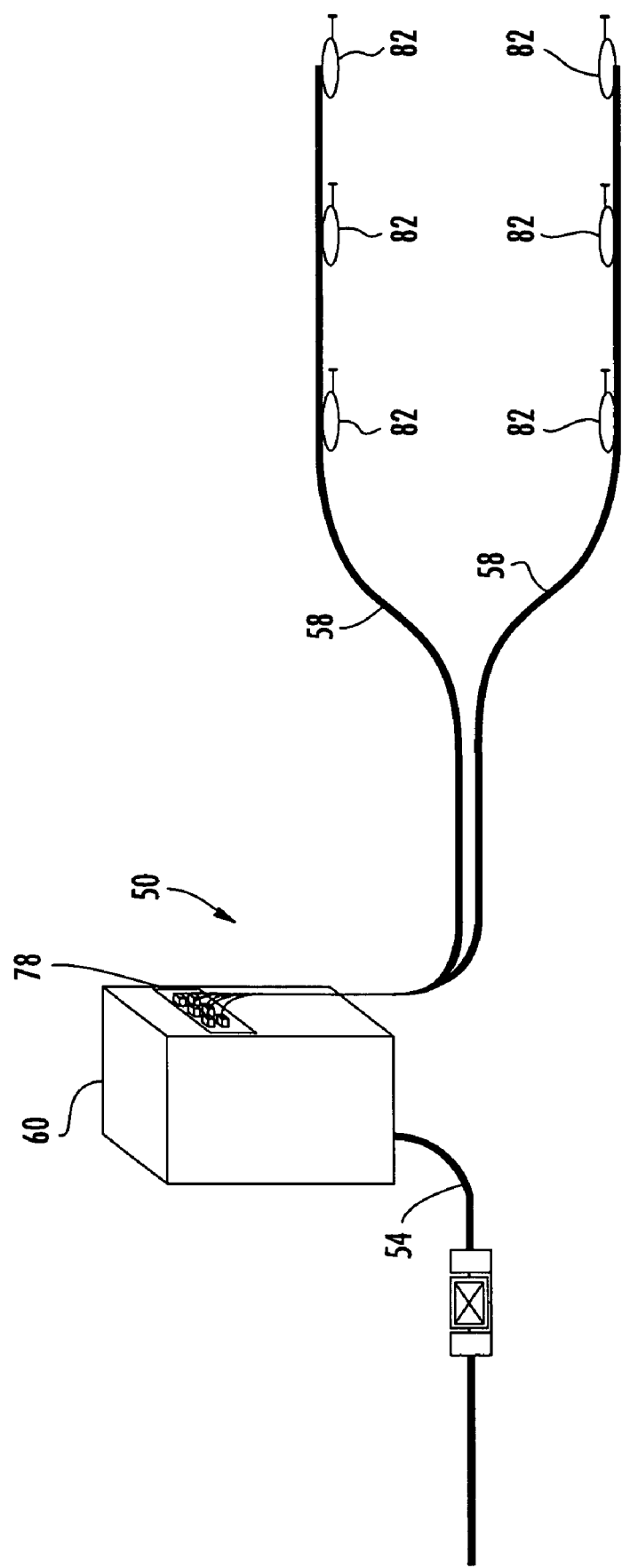
Figure 8:
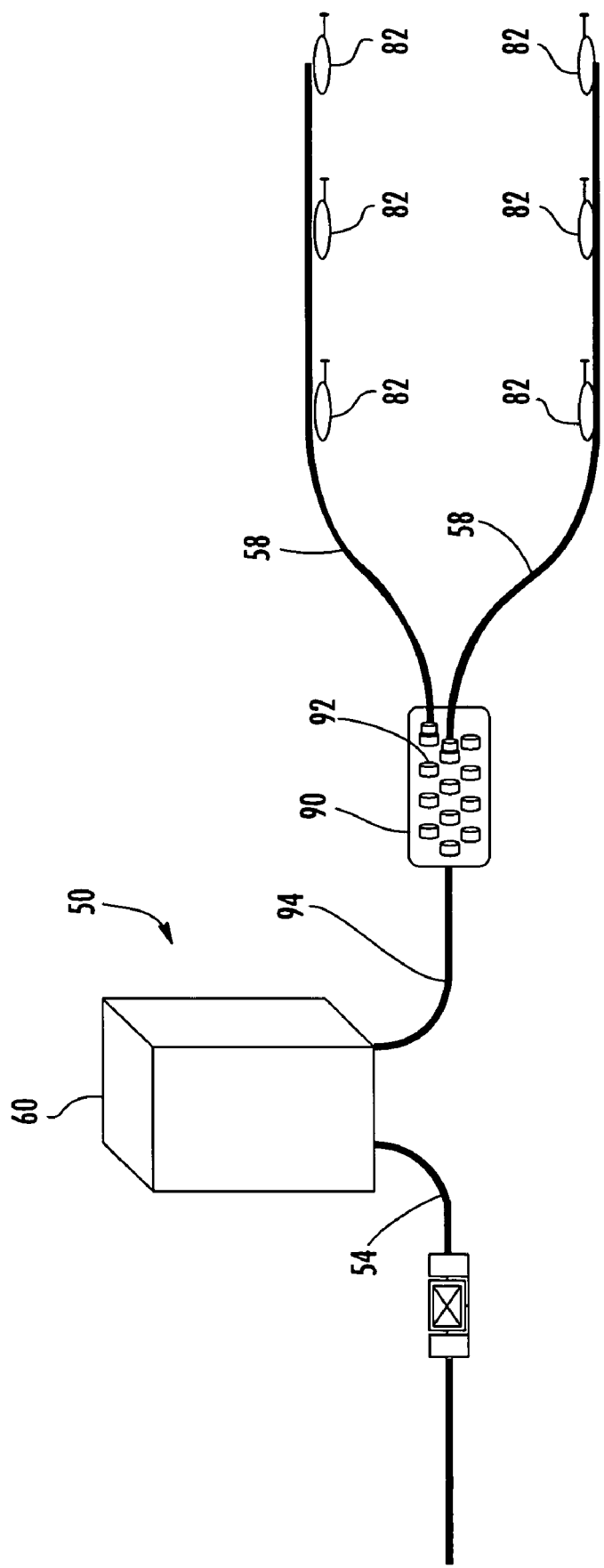
Figure 9:
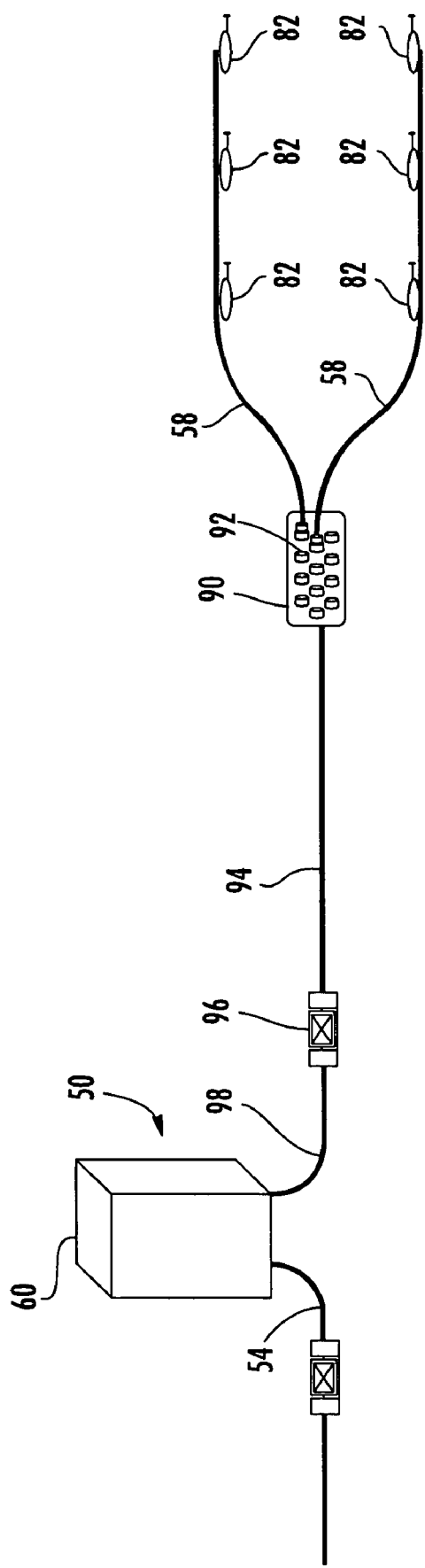

Having thus described the invention in general terms, reference will now be made to the accompanying drawings, which are not necessarily drawn to scale and are meant to be illustrative and not limiting, and wherein:

FIG. 1 is a schematic view of a prior art LCP, illustrating the splices required for the distribution cable;

FIG. 2 is a perspective schematic view of the prior art LCP of FIG. 1, further illustrating the splicing of the feeder cable and distribution cable;

FIG. 3 is a perspective schematic view of the prior art LCP of FIG. 1, illustrating additional splicing of the distribution cable;

FIG. 4 is a schematic view of an LCP in accordance with one embodiment of the present invention, illustrating the preconnectorized multi-fiber ports for use with thirty-six 12 fiber distribution cables;

FIG. 5 is a schematic view of an LCP in accordance with another embodiment of the present invention, illustrating the preconnectorized multi-fiber ports for use with six 72 fiber distribution cables;

FIG. 6 is a perspective schematic view of an LCP in accordance with yet another embodiment of the present invention, illustrating the preconnectorized multi-fiber ports provided on a panel within the interior cavity of the LCP;

FIG. 7 is a perspective schematic view of an LCP in accordance with yet another embodiment of the present invention, illustrating the preconnectorized multi-fiber ports provided on an exterior wall of the LCP;

FIG. 8 is a perspective schematic view of an LCP in accordance with yet another embodiment of the present invention, illustrating the preconnectorized multi-fiber ports provided on an accumulator outside the exterior wall of the LCP; and FIG. 9 is a perspective schematic view of an LCP in accordance with yet another embodiment of the present invention, illustrating the preconnectorized multi-fiber ports provided on an accumulator outside the exterior wall of the LCP, wherein the accumulator cable includes splices.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing preconnectorized multi-fiber ports with a local convergence point are described and shown in the accompanying drawings with regard to specific types of components, orientations, and configurations, it is envisioned that the functionality of the various apparatus of the present invention may be applied to any now known or hereafter devised local convergence points in which it is desired to provide preconnectorized multi-fiber ports. Like numbers refer to like elements throughout.

With reference to FIGS. 4-9, a number of local convergence points ("LCPs") in accordance with various embodiments of the present invention are illustrated. The LCPs of the present invention are intended to encompass fiber distribution hubs ("FDHs"), pedestals, pole-mounted LCPs, and any other outside plant local convergence points optically connecting a feeder cable (or a portion of a feeder cable) to one or more distribution cables.

Turning now to the embodiment of FIG. 4, an outside plant LCP 50 in a fiber optic distribution network is illustrated. The LCP 50 is adapted to provide optical connectivity between at least some of the optical fibers 52 of the feeder cable 54 and the optical fibers 56 of the one or more distribution cables 58. Some of the fibers (not shown) of the feeder cable 54 may pass through or bypass the LCP 50. The LCP 50 includes an enclosure 60 comprising an exterior wall, such as the side walls, top, and bottom of a fiber distribution hub, to provide one non-limiting example. The enclosure 60 does not necessarily need to be a complete enclosure and/or provide a seal or other barrier from the outside. The enclosure 60 of some embodiments of the present invention houses the internal components of the LCP 50. The enclosure 60 defines an interior cavity 62 therein, and the interior cavity is accessible through at least one door on at least one side of the LCP 50. Within the enclosure 60 of the LCP 50 of FIG. 4 is provided fourteen splitter modules 64 to split the fourteen optical fibers 52 of the feeder cable 54 into 432 pigtails 66 connected to the splitter modules. The optical fibers 52 of the feeder cable 54 are connected to the splitter module inputs 68 by adapters 70.

The plurality of pigtails 66 output from the splitter modules 64 are selectively inserted into adapters 72 of the subscriber termination field 74 mounted within the interior cavity. The subscriber termination field 74 comprises a plurality of adapters 72 (432 adapters in the embodiment of FIG. 4) that selectively optically connect the pigtails 66 to subscriber fibers 76 positioned on an opposite side of the subscriber termination field on which the pigtails are selectively connected to the adapters. The subscriber fibers 76 are optically connected to a plurality of preconnectorized multi-fiber ports 78. In the embodiment illustrated in FIG. 4, the preconnectorized multi-fiber ports 78 include the adapter 80 needed for the preconnectorized multi-fiber port to receive a preconnectorized end of a distribution cable; however, in further embodiments of the present invention the preconnectorized multi-fiber ports include no adapters and/or other devices to conveniently provide connection of the subscriber fibers to the optical fibers of the distribution cable without splicing.

The plurality of preconnectorized multi-fiber ports 78 of FIG. 4 includes thirty-six connectors comprising twelve fibers each. The plurality of preconnectorized multi-fiber ports 78 are provided on a panel within the interior cavity 62 of the LCP 50 such that the preconnectorized multi-fiber ports are in optical communication with the subscriber fibers 76. In the exemplary embodiment of FIG. 4, the panel on which the plurality of preconnectorized multi-fiber ports 78 are provided comprises a rear panel of the subscriber termination field 74. In further embodiments of the present invention the panel on which the plurality of preconnectorized multi-fiber ports are provided is a different panel and/or a stand-alone panel within the enclosure, such that a technician must open the at least one door of the enclosure to gain access to one or more of the plurality of preconnectorized multi-fiber ports. In such embodiments having the plurality of preconnectorized multi-fiber ports within the enclosure, the exterior wall provides convenient and secure routing of the distribution cable into the interior cavity of the enclosure.

The preconnectorized multi-fiber ports of some embodiments of the present invention comprise at least one alignment and keying feature adapted for mechanical interaction with at least one alignment and keying feature of the preconnectorized end of the distribution cable. One particular example of such preconnectorized multi-fiber ports includes the connectors disclosed in U.S. patent application Ser. No. 11/076,684 filed Mar. 10, 2005 and granted as U.S. Pat. No. 7,264,402, which is assigned to the present assignee, the disclosure of which is hereby incorporated by reference in its entirety. Further embodiments of the present invention include alternative devices to orient, secure, and otherwise connect the preconnectorized multi-fiber ports to the preconnectorized ends of the distribution cable.

Referring again to FIG. 4, the distribution cables 58 exit the enclosure 60 and preferably comprises a factory installed terminal system such that no splices are required along the distribution cable (including at an end opposite the preconnectorized end). An example of a factory installed terminal system for the distribution cable 58 is provided in FIG. 6, wherein the distribution cable comprises one or more tethers provided at mid span access locations 82 along the distribution cable. A non-limiting example of such a distribution cable is disclosed in U.S. patent application Ser. Nos. 11/432,637 and 11/432,579 both filed May 11, 2006 and assigned to the present assignee, the disclosures of which are hereby incorporated by reference in their entirety. Still further embodiments of the present invention include alternative factory installed terminal systems for providing convenient connections to the distribution cable.

Turning now to the exemplary embodiment of FIGS. 5 and 7, the LCP 50 is substantially similar to the LCP of FIG. 4; however, the plurality of preconnectorized multi-fiber ports 78 are provided on the exterior wall of the enclosure 60. By providing the preconnectorized multi-fiber ports 78 on the exterior wall of the enclosure, a technician is able to connect the distribution cable without entering the interior cavity 62 of the LCP 50. The LCP 50 of FIGS. 5 and 7 also includes only six preconnectorized multi-fiber ports 78 each comprising 72 fibers; however, further embodiments of the present invention comprise preconnectorized multi-fiber ports of alternative numbers of fibers, such as 4, 6, 8, 12, 16, 24, 32, 36, 48, 64, 72, and 96 to provide a few non-limiting examples.

Turning now to the LCP 50 of FIG. 8, the LCP includes an accumulator 90 outside the exterior wall of the enclosure 60. The accumulator is in optical connectivity with the subscriber termination field through an accumulator cable 94 comprising a plurality of subscriber fibers (which may or may not be in direct optical connectivity with the pigtails of the splitter). The accumulator cable 94 exits the interior cavity 62 of the enclosure 60 such that the accumulator is provided outside the enclosure, such that a technician is able to connect the distribution cables 58 without entering the enclosure.

The accumulator 90 of the embodiment of FIG. 8 includes a plurality of preconnectorized multi-fiber ports 92 adapted to receive a preconnectorized end of the distribution cables 58 to thereby provide optical connectivity between the plurality of subscriber fibers and the distribution cable. The accumulator 90 of some embodiments of the present invention comprises a multi-port optical connection terminal, such as the type disclosed in U.S. patent application Ser. Nos. 10/765,589 filed Jan. 27, 2004 and granted as U.S. Pat. No. 7,120,347, which is assigned to the present assignee, the disclosure of which is hereby incorporated by reference in its entirety. Still further embodiments of the present invention comprise alternative accumulators to provide preconnectorized multi-fiber ports outside the enclosure of the LCP.

Turning now to the LCP 50 of FIG. 9, a splice 96 is provide outside the LCP to splice the subscriber fibers 98 extending from the LCP 50 to the fibers of the accumulator cable 94 such that the subscriber fibers are in optical communication with the preconnectorized multi-fiber ports 92 of the accumulator 90 via a single splice. Alternative embodiments of the present invention provide a connector, rather than splice 96, to connect the accumulator to the LCP, while still further embodiments of the present invention provide still further devices and/or connections to provide improved connectivity between the LCP and the distribution cable(s).

With regards to the optical fibers used within the LCP, some embodiments of the present invention include various types of optical fibers which include, but are not limited to, low bend sensitivity optical fibers, bend optimized optical fibers, and bend insensitive optical fibers, all of which are referred to generically herein as "bend performance optical fiber." One specific example of bend performance optical fiber is microstructured optical fibers. Microstructured optical fibers comprise a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than 1400 nm, in other embodiments also greater than 1260 nm. The optical fibers provide a mode field at a wavelength of 1310 nm preferably greater than 8.0 microns, more preferably between 8.0 and 10.0 microns. The microstructured optical fibers of various embodiments define single-mode transmission optical fiber and/or multi-mode transmission optical fiber.

The microstructured optical fiber of some embodiments of the present invention comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than 30 percent, and the non-periodically disposed holes have a mean diameter of less than 1550 nm.

By "non-periodically disposed" or "non-periodic distribution", it is meant that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. In some embodiments, the core region comprises a single core segment having a positive maximum refractive index relative to pure silica $\Delta_1$ in %, and the single core segment extends from the centerline to a radius $R_1$. In one set of embodiments, $0.30\% < \Delta_1 < 0.40\%$, and $3.0$ $\mu m < R_1 < 5.0$ $\mu m$. In some embodiments, the single core segment has a refractive index profile with an alpha shape, where alpha is 6 or more, and in some embodiments alpha is 8 or more. In some embodiments, the inner annular hole-free region extends from the core region to a radius $R_2$, wherein the inner annular hole-free region has a radial width W12, equal to R2-R1, and W12 is greater than 1 μm. Radius R2 is preferably greater than 5 μm, more preferably greater than 6 μm. The intermediate annular hole-containing region extends radially outward from R2 to radius R3 and has a radial width W23, equal to R3-R2. The outer annular region extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region and the cladding region are preferably comprised of silica. The core region is preferably silica doped with one or more dopants. Preferably, the core region is hole-free. While not necessary limited, the hole-containing region preferably has an inner radius R2 which is not more than 20 μm. In some embodiments, R2 is not less than 10 μm and not greater than 20μm. In other embodiments, R2 is not less than 10 μm and not greater than 18 μm. In other embodiments, R2 is not less than 10 μm and not greater than 14 μm. Again, while not being limited to any particular width, the hole-containing region preferably has a radial width W23 which is not less than 0.5 μm. In some embodiments, W23 is not less than 0.5 μm and not greater than 20 μm. In other embodiments, W23 is not less than 2 μm and not greater than 12 μm. In other embodiments, W23 is not less than 2 μm and not greater than 10 μm.

Such fiber can be made to exhibit a fiber cutoff of less than 1400 nm, more preferably less than 1310 nm, a 20 mm macrobend induced loss of less than 0.5 dB/turn, preferably less than 0.1 dB/turn, more preferably less than 0.05 dB/turn, even more preferably less than 0.03 dB/turn, and still more preferably less than 0.02 dB/turn, a 12 mm macrobend induced loss of less than 1 dB/turn, preferably less than 0.5 dB/turn, more preferably less than 0.2 dB/turn, and even more preferably less than 0.1 dB/turn, and still even more preferably less than 0.05 dB/turn, and a 8 mm macrobend induced loss of less than 5 dB/turn, preferably less than 1 dB/turn, more preferably less than 0.5 dB/turn, and even more preferably less than 0.2 dB/turn and still even more preferably less than 0.1 dB/turn. An example of a suitable fiber is a fiber comprising a core region surrounded by a cladding region which comprises randomly disposed voids which are contained within an annular region spaced from the core and positioned to be effective to guide light along the core region.

Additional features of the microstructured optical fibers of additional embodiments of the present invention are described more fully in pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated and the disclosures of which are incorporated by reference herein.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. An outside plant local convergence point in a fiber optic distribution network comprising at least one feeder cable and at least one distribution cable, wherein the local convergence point is adapted to provide optical connectivity between the feeder cable and the distribution cable, the local convergence point comprising:

an enclosure comprising an exterior wall and an interior cavity therein, wherein access to the interior cavity is provided through at least one door;

a splitter mounted within the interior cavity and in optical communication with at least one optical fiber of the feeder cable and adapted to provide optical connectivity between the optical fiber of the feeder cable and a plurality of pigtails;

a subscriber termination field mounted within the interior cavity and comprising a plurality of adapters for selective optical connection between a pigtail of the plurality of pigtails and a subscriber fiber; and a plurality of preconnectorized multi-fiber ports provided on the exterior wall of the enclosure, wherein the preconnectorized multi-fiber ports are in optical communication with a plurality of subscriber fibers;

wherein the plurality of preconnectorized multi-fiber ports are adapted to receive a preconnectorized end of the distribution cable to thereby provide optical connectivity between the plurality of subscriber fibers and the distribution cable.

2. A local convergence point according to claim 1, wherein the preconnectorized multi-fiber ports comprise at least one of the following numbers of fibers: 4, 6, 8, 12, 16, 24, 32, 36, 48, 64, 72, and 96.

3. A local convergence point according to claim 1, wherein the preconnectorized multi-fiber ports include at least one alignment and keying feature adapted for mechanical interaction with at least one alignment and keying feature of the preconnectorized end of the distribution cable.

4. A local convergence point according to claim 1, wherein the plurality of preconnectorized multi-fiber ports are adapted to receive preconnectorized ends of distribution cables including one or more tethers provided at mid span access locations along the distribution cable.

5. A local convergence point according to claim 1, wherein the feeder cable is spliced to at least one stub cable in optical communication with the splitter.

6. A local convergence point according to claim 1, wherein at least one optical fiber within the enclosure comprises a microstructured optical fiber comprising a core region and a cladding region surrounding the core region, the cladding region Comprising an annular hole-containing region comprised of non-periodically disposed holes.

7. An outside plant local convergence point in a fiber optic distribution network comprising at least one feeder cable and at least one distribution cable, wherein the local convergence point is adapted to provide optical connectivity between the feeder cable and the distribution cable, the local Convergence point comprising:

an enclosure comprising an exterior wall and an interior cavity therein, wherein access to the interior cavity is provided through at least one door;

a splitter mounted within the interior cavity and in optical communication with at least one optical fiber of the feeder cable and adapted to provide optical connectivity between the optical fiber of the feeder cable and a plurality of pigtails;

a subscriber termination field mounted within the interior cavity and comprising a plurality of adapters for selective optical connection between a pigtail of the plurality of pigtails and a subscriber fiber; and an accumulator outside the exterior wall of the enclosure and in optical connectivity with the subscriber termination field through an accumulator cable comprising a plurality of subscriber fibers, wherein the accumulator cable exits the interior cavity of the enclosure and wherein the accumulator comprises a plurality of preconnectorized multi-fiber ports adapted to receive a preconnectorized end of the distribution cable to thereby provide optical connectivity between the plurality of subscriber fibers and the distribution cable.

8. A local convergence point according to claim 7, wherein the subscriber fibers are in direct optical communication with the preconnectorized multi-fiber ports of the accumulator without any intermediate splices or connectors.

9. A local convergence point according to claim 7, wherein the subscriber fibers are in optical communication with the preconnectorized multi-fiber ports of the accumulator via a single splice.

10. A local convergence point according to claim 7, wherein the subscriber fibers are in optical communication with the preconnectorized multi-fiber ports of the accumulator via a single connection.

11. A local convergence point according to claim 7, wherein the preconnectorized multi-fiber ports comprise at least one of the following numbers of fibers: 4, 6, 8, 12, 16, 24, 32, 36, 48, 64, 72, and 96.

12. A local convergence point according to claim 7, wherein the preconnectorized multi-fiber ports include at least one alignment and keying feature adapted for mechanical interaction with at least one alignment and keying feature of the preconnectorized end of the distribution cable.

13. A local convergence point according to claim 7, wherein the plurality of preconnectorized multi-fiber ports are adapted to receive preconnectorized ends of distribution cables including one or more tethers provided at mid span access locations along the distribution cable.

14. A local convergence point according to claim 7, wherein at least one optical fiber within the enclosure comprises a microstructured optical fiber comprising a core region and a cladding region surrounding the core region, the cladding region comprising an annular hole-containing region comprised of non-periodically disposed holes.

* * * * *